United States Patent [19]

Hrach

[11] Patent Number: 5,236,155
[45] Date of Patent: Aug. 17, 1993

[54] METHOD OF REDUCING DRAG IN AERODYNAMIC SYSTEMS

[75] Inventor: Frank J. Hrach, Parma, Ohio

[73] Assignee: The United States of America as represented by the Administrator of the National Aeronautics and Space Administration, Washington, D.C.

[21] Appl. No.: 943,659

[22] Filed: Sep. 11, 1992

[51] Int. Cl.$^5$ ............................................. B64C 21/04
[52] U.S. Cl. ...................................... 244/208; 244/130; 244/209
[58] Field of Search ............... 244/207, 208, 209, 130, 244/204, 12.1, 35 R

[56] References Cited

U.S. PATENT DOCUMENTS

| | | | |
|---|---|---|---|
| 1,691,942 | 11/1928 | Stalker | 244/208 |
| 1,829,616 | 10/1931 | Stalker | 244/208 |
| 1,913,644 | 6/1933 | Stalker | 244/208 |
| 1,973,835 | 9/1934 | Wood | 244/12 |
| 1,988,670 | 1/1935 | Stalker | 244/12 |
| 2,408,632 | 10/1946 | Griffith | 244/40 |
| 2,416,991 | 3/1947 | Griffith | 244/40 |
| 2,498,140 | 2/1950 | Stalker | 244/40 |
| 2,545,010 | 3/1951 | Stalker | 244/208 |
| 2,841,344 | 7/1958 | Stroukoff | 244/208 |
| 3,261,576 | 7/1966 | Valyi | 244/130 |
| 3,465,990 | 9/1969 | Holland | 244/53 |
| 3,887,147 | 6/1975 | Grieb | 244/208 |
| 4,169,567 | 10/1979 | Tamura | 244/17.11 |
| 4,477,040 | 10/1984 | Karanik | 244/58 |
| 4,664,345 | 5/1987 | Lurz | 244/209 |
| 4,666,104 | 5/1987 | Kelber | 244/12.1 |

OTHER PUBLICATIONS

Test Techniques for Engine/Airframe Integration A E Harris AGARD (69th Fluid Dynamics Panel Meeting and Symposium pp. 1–16.

*Primary Examiner*—Margaret A. Focarino
*Assistant Examiner*—Christopher P. Ellis
*Attorney, Agent, or Firm*—Gene E. Shook; Guy M. Miller; James A. Mackin

[57] ABSTRACT

In the present method boundary layer thickening is combined with laminar flow control to reduce drag. An aerodynamic body is accelerated enabling a ram turbine on the body to receive air at velocity $V_o$. The discharge air is directed over an aft portion of the aerodynamic body producing boundary layer thickening. The ram turbine also drives a compressor by applying torque to a shaft connected between the ram turbine and the compressor.

The compressor sucks in lower boundary layer air through inlets in the shell of the aircraft producing laminar flow control and reducing drag. The discharge from the compressor is expanded in a nozzle to produce thrust.

12 Claims, 2 Drawing Sheets

METHOD OF REDUCING DRAG IN AERODYNAMIC SYSTEMS

ORIGIN OF THE INVENTION

The invention described herein was made by an employee of the U.S. Government and may be manufactured or used by or for the U.S. Government without the payment of any royalties thereon or therefore.

FIELD OF THE INVENTION

The present invention is directed to a method of reducing drag in aerodynamic systems by combining laminar flow control with boundary layer thickening.

Increasing drag in modern aircraft systems has served as a way of increasing overall performance by improving the efficiency and speed of the aircraft. It is well documented that turbulent flow over aircraft surfaces reduces the overall flight performance of an aircraft. It is therefore desirable to produce laminar flow over aircraft surfaces, and to do so in a manner that accounts for all of the power in the system.

It is therefore an object of the present invention to apply an aerodynamic accounting paradigm that accounts for all of the energy in the aerodynamic system and gives the true propulsion efficiency.

It is a further object of this invention to reduce drag by combining laminar flow control with boundary layer thickening.

DESCRIPTION OF THE RELATED ART

Stalker U.S. Pat. No. 1,691,942 is directed to an aircraft with a ram turbine that drives a blower having its intake connected to holes in the wing surface. Stalker U.S. Pat. No. 1,829,616 is similar. This invention is also directed to a blower driven by a ram air turbine.

In Wood U.S. Pat. No. 1,973,835 boundary layer air is sucked in through fuselage openings by means of the ventura effect produced in a nozzle.

In Stalker U.S. Pat. No. 2,498,140 the blades of a propeller can be deployed outwardly to a position in which the propeller serves as a power source for the boundary induction system.

Griffith U.S. Pat. No. 2,408,632 describes a system in which a suction pump pulls boundary layer air through an intake valve connected to the surface of the aircraft and discharges the air rearwardly through a delivery conduit.

Valyi U.S. Pat. No. 3,261,576 shows an aircraft carried ventura system positioned in the slipstream to suck boundary layer air from the wing surface.

Karanik U.S. Pat. No. 4,477,040 discloses a turbine to provide shaft power to drive an electrical generator.

SUMMARY OF THE INVENTION

This invention is directed to a drag reduction method and apparatus that combines laminar flow control with boundary layer thickening to reduce drag.

A conventional thruster moves an aircraft through the air, causing airflow over the surface of the aircraft. This process transfers power from the conventional thruster to the boundary layer air in the form of kinetic energy. A portion of this air along with its energy is brought on board the aircraft (for laminar flow control, for example). The conventional thruster also transfers power to the air entering ram air turbines mounted on the surface of the aircraft. A portion of this power is converted to mechanical power and transferred through a shaft to boundary layer compressors which create suction to pull in lower boundary layer air through small inlets in the shell of the aircraft. This air is then sucked into the compressor and compressed. In the process, energy is added to the kinetic energy the air already has. The air is then expanded in a nozzle, thereby producing thrust. The air is released over the surface of the aircraft creating boundary layer thickening and reducing drag.

The process used was the result of an inventive paradigm that was developed, using several design assumptions. Among these were steady level flight causing skin friction drag, very little drag due to lift, and all the air affected by the surface brought on-board. There is zero duct pressure loss, 100% compressor efficiency and lastly, a boundary layer exit velocity which equals the flight velocity. Working with the stated conditions the propulsion efficiency would equal the following:

$$\begin{aligned}
\text{Propulsion efficiency} &= \frac{\text{Power applied to the aircraft}}{\text{Rate of Production of propellant Kinetic Energy}} \\
&= \frac{\text{Thrust} \times \text{Flight Velocity}}{\text{Rate at which Kinetic Energy is added by the compressor}} \\
&= \frac{\dot{m}V_0}{1} \frac{XV_0}{\dot{m}V_0^2} \\
&= 2
\end{aligned}$$

In steady level flight, the thrust power, equal to $\dot{m}V_0^2$, is transferred to the air flowing over the plate. All the air that is affected by the surface, along with the power it contains, is brought on board and routed to the boundary layer thruster. The air has available kinetic power equal to $\frac{1}{2}\dot{m}V_0^2$ by virtue of the fact that it is moving at flight velocity.

This power added to the power supplied by the compressor equals the output thrust power. The other half of the power in the boundary layer air, $\frac{1}{2}\dot{m}V_0^2$ is in the form of unavailable thermal energy. The present analysis utilizes the available kinetic power in the boundary layer air. It has been widely held in the field that accelerating the boundary layer exhaust in an aircraft relative to the aircraft produces thrust.

However, traditional power accounting systems have not taken into account the power that is in the boundary layer air. When this power is added to the system, twice the efficiency results.

BRIEF DESCRIPTION OF THE DRAWINGS

The object's advantages, and novel features of the invention will become more fully apparent from the following detailed description when read in conjunction with the accompanying drawings wherein;

FIG. 2 also displays non-dimensional power versus the ratio of boundary layer exhaust velocity to flight velocity for an assumed value of efficiency of 0.75.

DETAILED DESCRIPTION OF THE PREFERRED EMBODIMENTS

In the preferred embodiment a flat aerodynamic body is moving through the air at velocity $V_o$, creating an airflow of $V_o$ over the body. A portion of the boundary layer air is sucked off the surface of the boundary layer compressor, which produces a constant mass flow rate of $\dot{m}_1$ at the compressor. A negligible pressure drop is produced as air flows through holes or slots in the plate and through the duct. The air is then compressed and accelerated to velocity $V_1$ by a nozzle, producing thrust. Power P used to drive the compressor is obtained from the ram air turbine by means of a shaft. Since the flat aerodynamic body is moving at a velocity $V_o$ the air mass flow rate of $\dot{m}_2$ enters the ram air turbine at velocity $V_o$ and exists at velocity $V_2$, producing drag.

It is apparent that:

Net Drag = Drag on the surface −

Thrust obtained from accelerating the boundary layer air +

Drag produced by the ram air turbine

As a result of the drag on the surface being constant, the lowest net drag is obtained when $\Delta T$ is high $\Delta T =$ Thrust obtained from accelerating the boundary layer air −

Drag produced by the ram turbine subject to the condition that:

Power produced by the ram air turbine = Power supplied to the boundary layer air compressor.

The mathematical formulation is $\Delta T = \dot{m}_1 V_1 - \dot{m}_2 (V_0 - V_2)$ Subject to $P = \eta_t [\frac{1}{2} \dot{m}_2 (V_0^2 - V_2^2)] = \frac{1}{\eta_c} [\frac{1}{2} \dot{m}_1 V_1^2]$ where
 $\eta_t$ = turbine efficiency of the ram turbine
 $\eta_c$ = compressor efficiency of the boundary layer air compressor.

Solving the constraint equation of $\dot{m}_2$ and substituting into the performance function yields;

$$\dot{m}_2 = \frac{1}{\eta} \frac{V_1^2}{V_0^2 - V_2^2} \dot{m}_1 \text{ where } \eta = \eta_t \eta_c$$

$$\frac{\Delta T}{\dot{m}_1 V_0} = \frac{V_1}{V_0} - \frac{1}{\eta} \frac{(V_1/V_0)^2}{1 + V_2/V_0}$$

The ratio of the flow rates is given by;

$$\frac{\dot{m}_2}{\dot{m}_1} = \frac{1}{\eta} \frac{(V_1/V_0)^2}{1 - (V_2/V_0)^2}$$

From the constraint equation, the power transferred from the ram air turbine to the boundary layer compressor can be written as $$\frac{P}{\eta_t \dot{m}_1 V_0^2} = \frac{(V_1/V_0)^2}{2\eta}$$

Therefore, nondimensional thrust equals;

$$\frac{\Delta T}{\dot{m}_1 V_0} = \frac{V_1}{V_2} - \frac{1}{\eta} \frac{(V_1/V_0)^2}{1 + V_2/V_0}$$

The ratio of mass flow rates equals;

$$\frac{\dot{m}_2}{\dot{m}_1} = \frac{1}{\eta} \frac{(V_1/V_0)^2}{1 - (V_2/V_0)^2}$$

and nondimensional power equals;

$$\frac{P}{\eta_t \dot{m}_1 V_0^2} = \frac{(V_1/V_0)^2}{2\eta}$$

Figure 1:
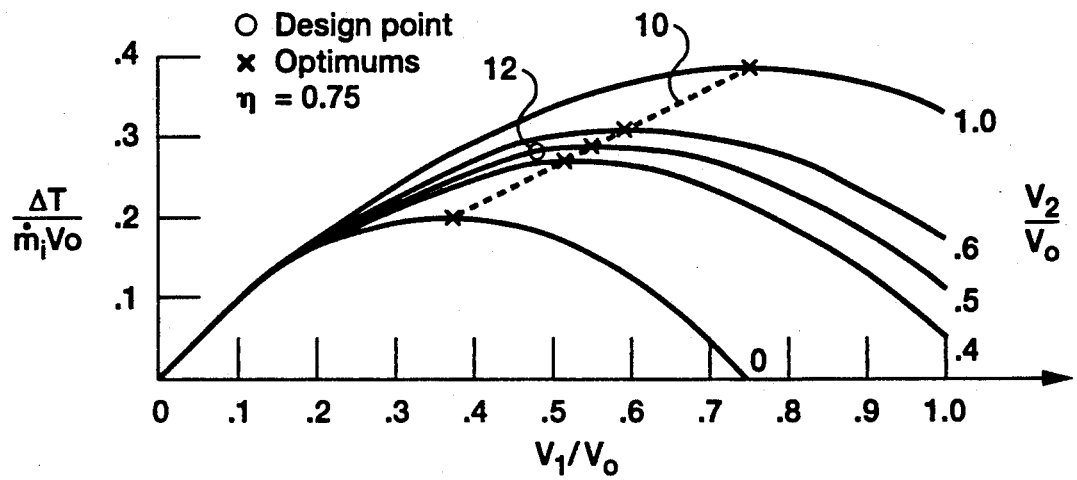
FIG. 1 is a graph displaying non-dimensional thrust versus the ratio of boundary layer exhaust velocity to flight velocity for various values of the ratio of ram air turbine exhaust velocity to flight velocity for an assumed value of efficiency of 0.75.
Figure 2:
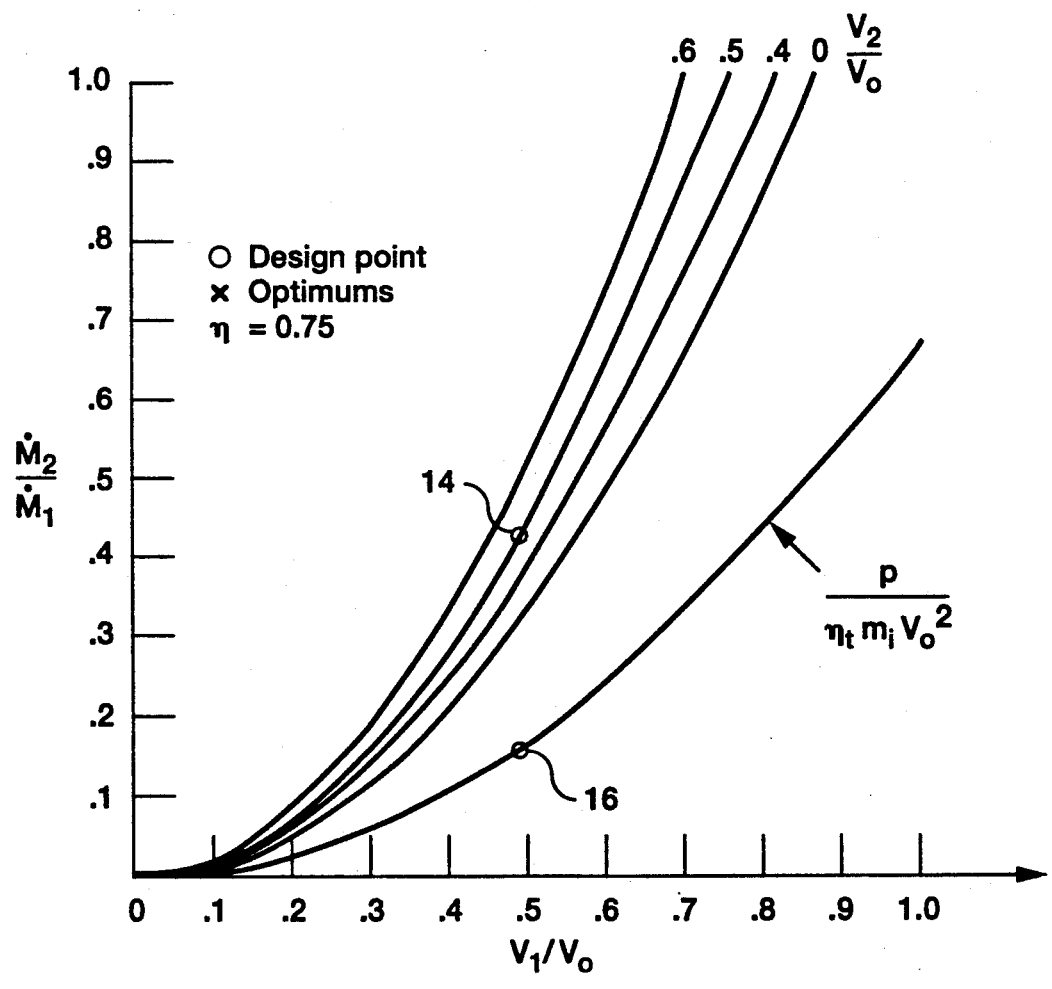
FIG. 2 is a graph displaying the ratio of ram air turbine mass flow rate to boundary layer mass flow rate versus the ratio of boundary layer exhaust velocity to flight velocity for various values of the ratio of ram air turbine exhaust velocity in flight velocity for an assumed value of efficiency of 0.75.
Figure 3:
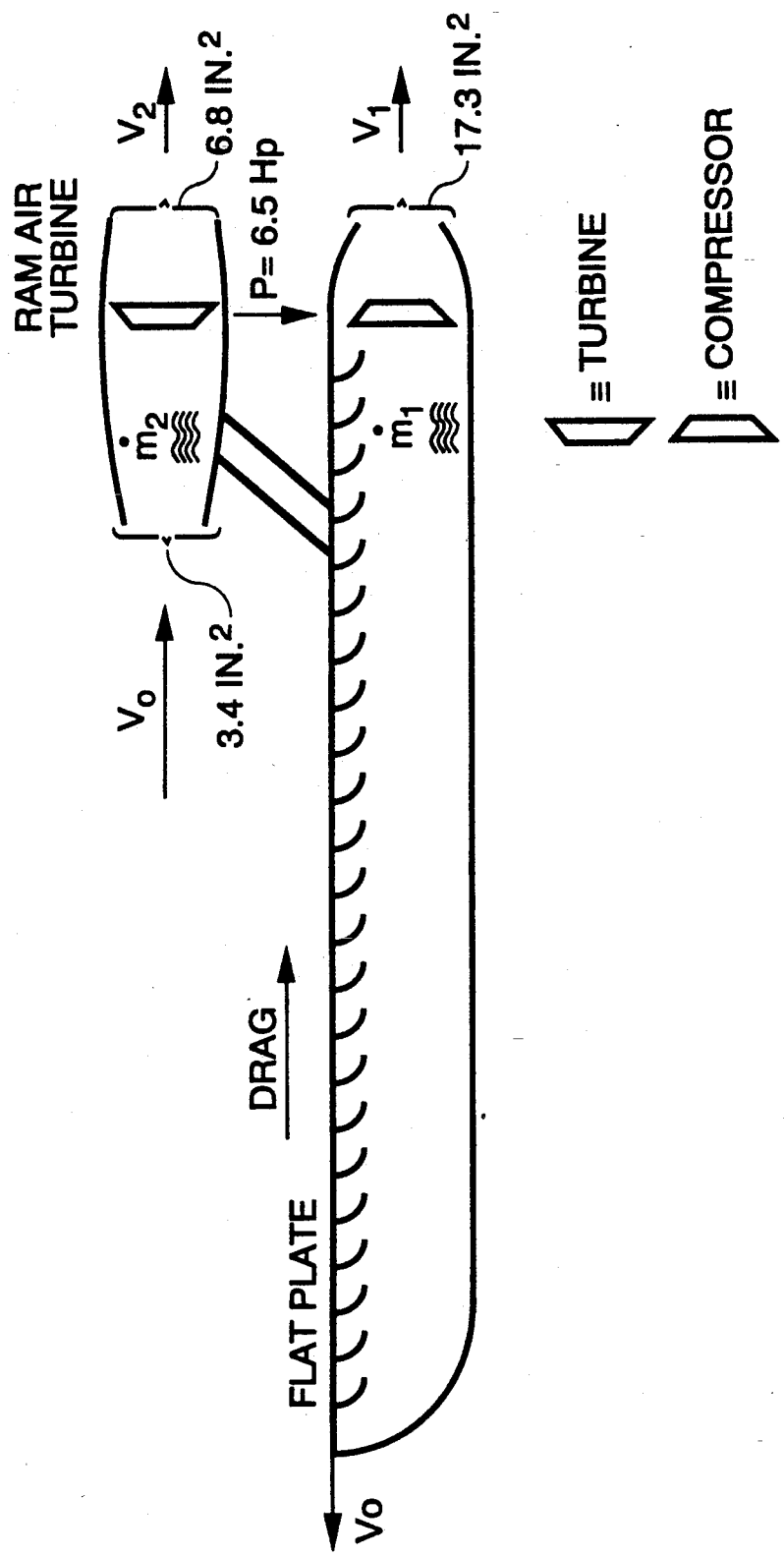
FIG. 3 displays a schematic view of an aircraft utilized in the present invention.

The previous equations are used to produce FIGS. 1 and 2 for an assumed value of $\eta = 0.75$. These figures can then be used as a basis for the selection of the design point.

The maximum value of thrust obtained in the aerodynamic structure defined above would occur when $V_2 = V_o$. In this case, however, an infinite mass flow rate would be required to produce any power, requiring that the ram air turbine inlet and exit areas be infinitely large. The minimum value of the required air flow through the ram air turbine is obtained when $V_2 = 0$. But here again, the ram air turbine nozzle exit area would have to be infinitely large to handle the zero velocity air. Using the continuity equation, it can be shown that the minimum ram air turbine nozzle exit area occurs at a value of $V_2/V_o = \sqrt{3}/3 = 0.577$. Both mass flow through the ram air turbine and its required power increase with $V_1$. Thus a low value of this velocity is desirable to keep the ram air turbine small, but the thrust benefit gets smaller as $V_1$ is reduced. Based on these considerations a design value of $V_1/V_o = \frac{1}{2}$ and $V_2/V_o = \frac{1}{2}$ is selected.

At the design point;

$$\frac{\Delta T}{\dot{m}_1 V_0} = .278, \frac{\dot{m}_2}{\dot{m}_1} = .444, \text{ and } \frac{P}{\eta_t \dot{m}_1 V_0^2} = .167$$

In addition, for a flight speed of M=0.8 and an altitude of 30,000 ft. velocity $V_o = 796$ ft/sec and $\rho_o = 8.9 \times 10^{-4}$ slugs/ft$^3$. If these values of $V_o$ and $\rho_o$ are combined with an area over which air is collected of 100 ft$^2$, a suction flow coefficient ($\dot{m}_1/\rho_o A V_0$) equal to $6 \times 10^{-4}$, and a ram air turbine efficiency $\eta_t = 0.9$; the following ram turbine inlet area, exit area, power transmitted to the compressor, boundary layer air nozzle exit area, results;
 ram air turbine inlet area = 3.4 in$^2$
 ram air turbine exit area = 6.8 in$^2$
 power transmitted to the compressor = 6.5 Hp
 boundary layer air nozzle exit area = 17.3 in$^2$ The thrust benefit ($\Delta T/m_1 V_o$) using the present method equals 0.278.

In other words the drag on the surface is partially offset by a thrust equal to about 28% of the ram drag of the boundary layer air brought on board.

FIG. 1 displays a line of maximum thrust 10 for the range of possible values of $V_2/V_o$. The selected design point 12 is indicated on the figure.

In FIG. 2 the design point is indicated on the mass flow rate ratio curves 14 and on the non-dimensional power curve 16.

While the preferred embodiment of the invention is disclosed and described, it will be apparent that various modifications may be made without departing from the spirit of the invention or the scope of the subjoined claims.

What is claimed:

1. A method of overcoming drag on an aircraft having at least one thruster, a plurality of ram air turbines, a plurality of boundary layer compressors and compressor nozzles, by combining laminar flow control with boundary layer thickening the steps comprising:
    a) Transferring kinetic power from said one thruster mounted on said aircraft to said ram air turbines by using said thruster to accelerate said aircraft whereby ram airflow including a boundary layer is created over said aircraft at a ram turbine mass flow rate and at ram air velocity thereby transferring power from said one thruster through the ram airflow to said ram air turbines when said ram air flow enters the ram air turbines;
    b) Directing exhaust from said ram air turbines over a surface of said aircraft at a ram turbine exhaust velocity whereby boundary layer thickening occurs thereby reducing skin friction drag;
    c) Transferring ram turbine power from said ram air turbines to at least one of the boundary layer compressors by using a torque transmitting means;
    d) Using at least one of said compressors to suck in lower boundary layer air having said kinetic power at a boundary layer mass flow rate whereby laminar flow is created thereby reducing surface drag;
    e) Adding additional power by compressing said lower boundary layer air to said at least one boundary layer compressor whereby compressed air is created;
    f) Expanding said compressed air in at least one of said compressor nozzles thereby creating nozzle thrust to overcome drag due to said ram air turbines and offset said surface drag, and
    g) Directing exhaust from said at least one compressor nozzle at a nozzle exhaust velocity over the surface of said aircraft whereby boundary layer thickening occurs thereby reducing drag.

2. A method as claimed in claim 1 wherein a ratio of said nozzle exhaust velocity to said ram air velocity is 1 to 2.

3. A method as claimed in claim 1 wherein a ratio of said ram turbine exhaust velocity to said ram air velocity is 1 to 2.

4. A method as claimed in claim 1 wherein a ratio of said ram turbine mass flow rate to said boundary layer mass flow rate is 0.444.

5. A method as claimed in claim 1 wherein a ratio of the addition of said nozzle thrust and drag from said ram air turbine to the product of said boundary layer mass flow rate and said ram air velocity is 0.278.

6. A method as claimed in claim 1 wherein a ratio of said ram turbine power to a product of a ram air turbine efficiency of 0.9 and the boundary layer mass flow rate and the ram air velocity squared is 0.167.

7. A method of combining laminar flow control with boundary layer thickening comprising the steps of;
    a) Accelerating an aircraft using at least one thruster thereby creating airflow including a lower boundary layer and having kinetic power at ram air velocities over said aircraft;
    b) Creating ram air turbine power by transmitting said kinetic air power to a plurality of ram air turbines mounted on said aircraft when said airflow enters said ram air turbines at said ram air velocities;
    c) Converting part of the ram air turbine power to mechanical power by means of at least one shaft connected at one end to said ram air turbine and at the opposite end to a boundary layer compressor thereby driving said boundary layer compressor;
    d) Using said boundary layer compressor to suck in said lower boundary layer air of said airflow through inlets in a plurality of surfaces of said aircraft;
    e) Adding additional kinetic power by compressing said lower boundary layer air sucked into said boundary layer compressor thereby creating compressed air;
    f) Creating thrust by expanding said compressed air in a nozzle thereby overcoming drag due to said ram air turbines and offsetting surface drag; and
    g) Using boundary layer compressor discharge to create boundary layer thickening by allowing said boundary layer compressor to discharge over the surface of said aircraft.

8. An aircraft drag reduction propulsion apparatus comprising;
    a plurality of main engines for accelerating the aircraft thereby creating airflow having lower boundary layer air over the surface of said aircraft whereby power is transferred from the thrusters to said airflow,
    a plurality of ram air turbines including a ram air entrance area and a ram air exit area for receiving said airflow thereby transferring power from the airflow to said ram air turbines;
    a torque transferring means for converting the power in said ram air turbines to mechanical power;
    a boundary layer compressor driven by the mechanical power converted by said torque transferring means and used for sucking lower boundary layer air from said airflow thereby creating laminar flow on the surface of said aircraft; and
    a nozzle for receiving and expanding the air from said boundary layer compressor thereby accelerating the boundary layer air relative to said aircraft and producing thrust power.

9. An apparatus as claimed in claim 8 wherein said ram air entrance area has a dimension of about 3.4 $in^2$.

10. An apparatus as claimed in claim 8 wherein said ram air exit area has a dimension of about 6.8 $in^2$.

11. An apparatus as claimed in claim 8 wherein said mechanical power is 6.5 Hp.

12. An apparatus as claimed in claim 8 wherein said nozzle has a dimensional area of about 17.3 $in^2$.

* * * * *